United States Patent [19]

DeLuca

[11] 4,223,942
[45] Sep. 23, 1980

[54] SUNROOF

[76] Inventor: Lawrence DeLuca, 2903 Dawson Ave., Wheaton, Md. 20902

[21] Appl. No.: 932,312

[22] Filed: Aug. 9, 1978

[51] Int. Cl.² ............................................. B60J 7/10
[52] U.S. Cl. .................................................. 296/222
[58] Field of Search .......... 296/137 E, 137 G, 137 H; 49/360

[56] References Cited
U.S. PATENT DOCUMENTS

| | | | |
|---|---|---|---|
| 2,968,514 | 1/1961 | Golde | 296/137 E |
| 2,973,991 | 3/1961 | Werner | 296/137 E |
| 2,985,483 | 5/1961 | Bishop | 296/137 E |
| 3,016,263 | 1/1962 | Rehmann | 296/137 E |
| 3,031,226 | 4/1962 | Larche | 296/137 E |
| 3,874,722 | 4/1975 | Pickles | 296/137 G |
| 3,981,531 | 9/1976 | Koral | 296/137 G |
| 4,023,858 | 5/1977 | Bienert | 296/137 G |
| 4,039,222 | 8/1977 | Wolf | 296/137 E |

Primary Examiner—Robert R. Song
Attorney, Agent, or Firm—Armstrong, Nikaido, Marmelstein & Kubovcik

[57] ABSTRACT

A vehicle sunroof comprised of a movable panel which is either transparent, translucent, opaque, or solid where movement is controlled by activation of an electric motor which causes the movable panel to drop down and slide rearward into an opening between the vehicle roof and the interior upholstry and which includes a light-weight housing, a transporting mechanism for providing purely vertical movement to the panel, a sealing means, a threaded shaft, forward and rear slide blocks, a slide plate, a riser bar, a verticle slide, all combined into a single, self-contained unit.

3 Claims, 4 Drawing Figures

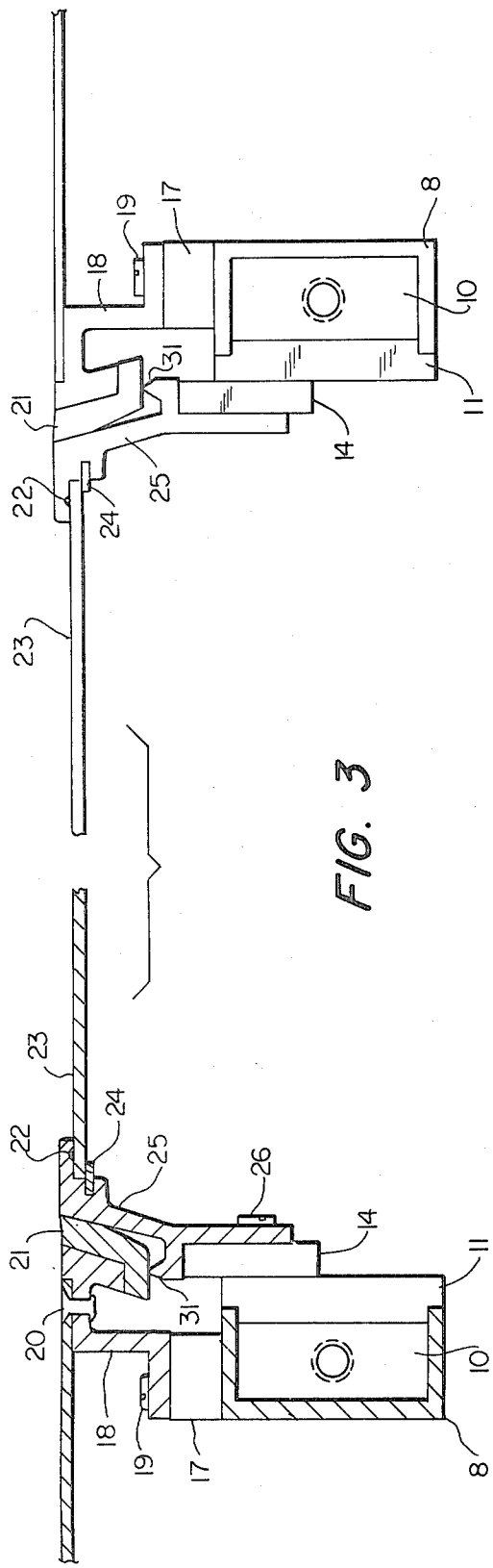
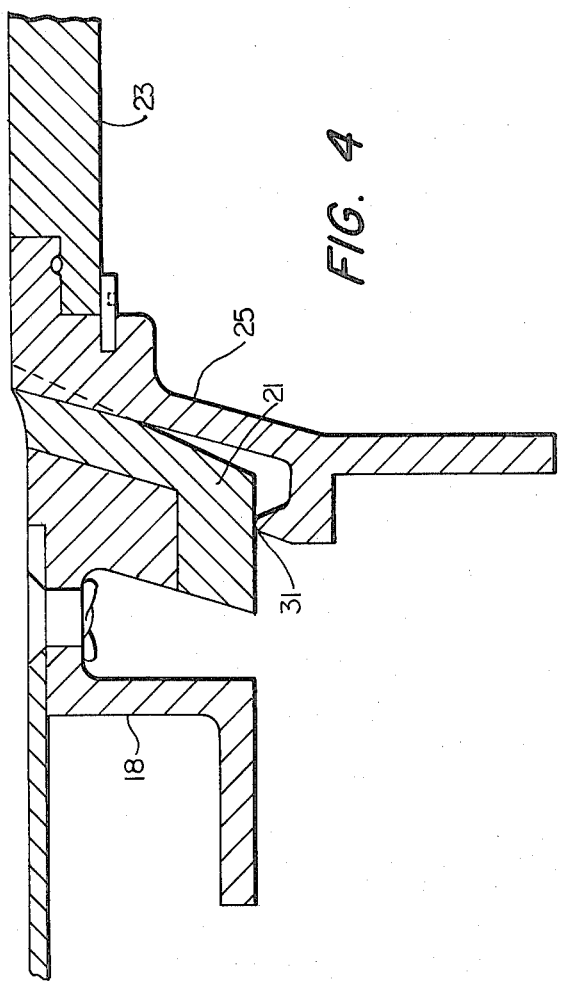
FIG. 3
FIG. 4

SUNROOF

BACKGROUND OF THE INVENTION

The present invention relates to a movable sunroof design, especially in relation to vehicles. Previously, there have been efforts to provide a roof panel or window which is dropped down upon opening and thereafter slides by various mechanical drives and means into an opening between the roof and the interior upholstry of a vehicle. In many situations, a gutter is provided for the collection of water that leaks through the sides of the opening. The water collects and the gutter drains out by means of tubes that extend along the frame of the vehicle. Additionally, previous structures have required some type of preparation of the cut edges of the vehicle roof, where the sun roof structure is to be installed, such as a forming or beading, or the like. A further requirement of prior structures has been the utilization of some sort of gear reduction unit between the motor and drive mechanism. In the past, sunroof structures, especially for vehicles, in requiring the gutter for collection of water and tubes for disposal as well as preparation of the roof edges have all been problems making the sunroof structures more complex, subject to breakdown and generally less acceptable. Moreover, the addtitional requirement of a gear reduction unit increases the mechanical requirements of the sunroof unnecessarily and all of these items increase the cost.

Attempts to remedy the defects and drawbacks of the past structures have been without success. There has been no discovery of an acceptable mechanism without a gear reduction unit or a combination of structural features overcoming the need for a gutter and drainage combination. Further, attempts to simplify the sunroof mechanism structure have not been successful in achieving that goal.

The primary object of the present invention is to provide a mechanism which overcomes the problems and deficiencies associated with past sunroof structures.

Another object of the invention is to provide a sunroof that does not require a gutter or water collection system and drainage system.

A further object of the invention is to provide a sunroof that can be installed as one complete unit in which the mating surfaces that are to seal are integral components of the one unit.

A still further object of the present invention is to provide a sunroof mechanism susceptible to an installation technique in which no special preparation of the vehicle roof is required, such as beading or folding or special shaping of the cut edge.

A further object of the present invention is to provide a sunroof mechanism with a light-weight housing, a structure not requiring a gear reduction unit, a transportation mechanism for providing purely vertical movement and for the transfer of maximum power to the panel when it is to be placed in the raised attitude, as well as permitting easy replacement of the panel itself so as to alternate opaque, translucent or transparent panels.

Yet another object of the present invention is to provide a mechanism of the class indicated which is capable of the functions referred to and which is based upon the principles of sound construction.

Other objects will appear hereinafter.

SUMMARY OF THE INVENTION

In accordance with the present invention, a sunroof mechanism structure is provided. An electric motor drives two threaded rods by means of a slip clutch, chain and sprockets. The two threaded rods are supported at each end by bearing means which run longitudinally through the center channel section on each side of the frame of the unit. A riser assembly within the opening in the channels is driven by a plurality of screw means and an internally-threaded block that engages the threaded rods. The panel, window or the like is attached to the riser assembly and it moves simultaneously with it. As the panel moves toward the forwardmost portion of the frame unit, a portion of the riser assembly will contact the front portion of the frame unit and immediately assume a verticle motion. The verticle motion is caused by two inclined slots which are engaged by two pins in each riser assembly. As the panel moves vertically, it will contact an elastomeric type of seal which is captivated by another integral component of the sunroof unit. Together, the two components, that is the elastomeric seal and the captive frame in which the seal is held, comprise a sealing ring. As the panel contacts the elastomeric seal it compresses it by means of a tapered, interference fit. When the proper pressure is arrived at, the slip clutch slips and all panel movement stops. The panel is closed and sealed at this point in operation. Opening the sunroof by reverse movement of the panel operates in a similar manner.

BRIEF DESCRIPTION OF THE DRAWING

For a more complete understanding of the invention, reference will be made to the attached drawing figures forming a part of the present application.

There is shown in:

FIG. 3 A sectional view along line A—A in FIG. 2 with the window moved forward and up.

FIG. 4 A cross-section of the sealing configuration of the unit.

DETAILED DESCRIPTION OF THE DRAWING

Figure 1:
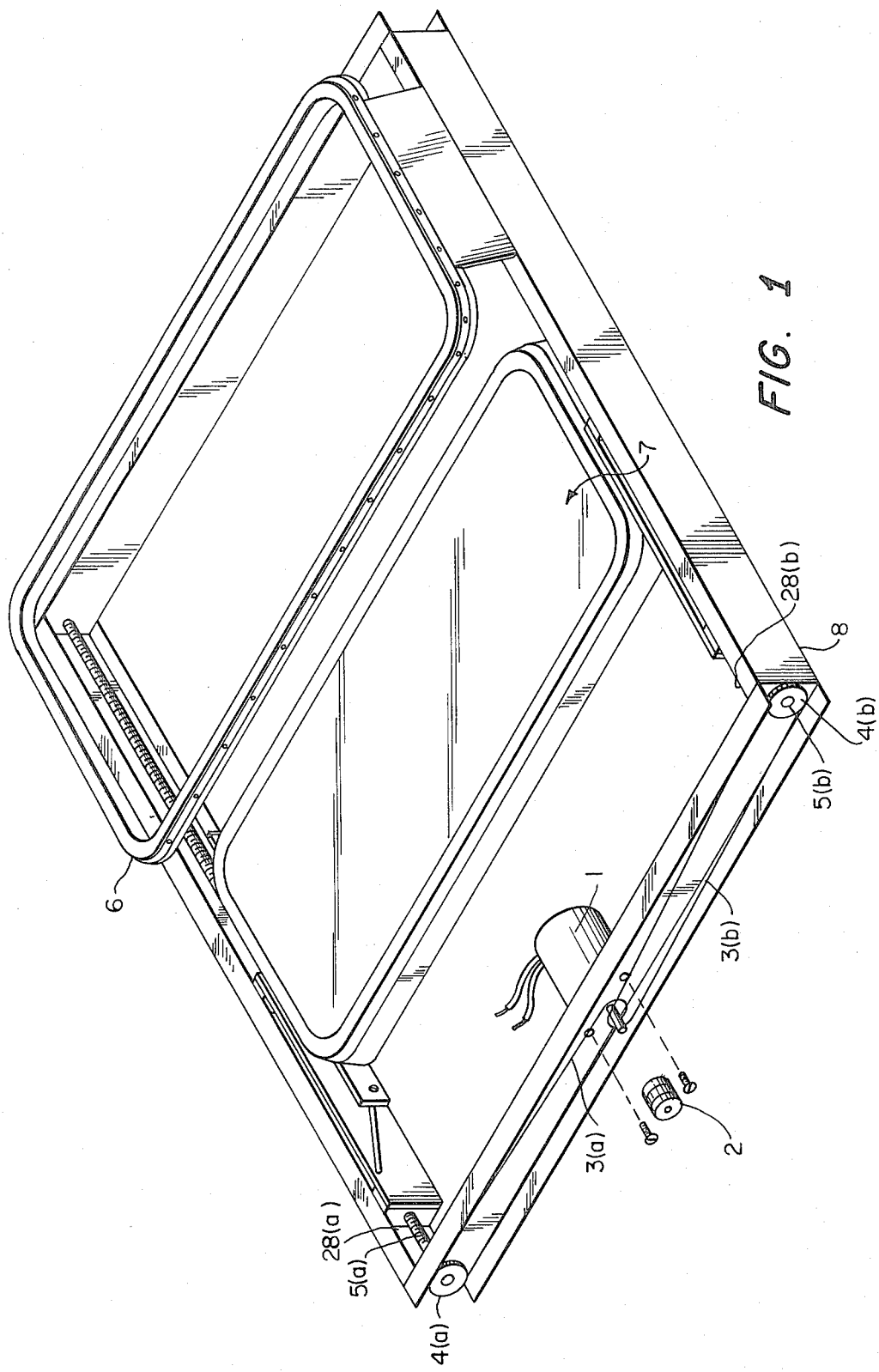
FIG. 1 An overall perspective view of the complete sunroof unit.

Referrring now to FIGS. 1 through 4 and to the details of the construction and operation of the invention, in the preferred embodiment of the invention and assuming the movable panel to be in the open position, that is, the rearwardmost position, the sequence starts as follows: When power is applied to the electric motor 1 in Frame 8, rotational output is applied to the threaded shafts 5(a) and 5(b) by means of the adjustable slip clutch 2, chains 3 (a) and 3 (b) and sprockets 4 (a) and 4 (b). The direction of the motor shaft rotation and, hence, the threaded shaft 5 (a) and 5 (b) rotation will be dependent upon the electrical connection of the motor 1. The threaded shafts 5 (a) and 5 (b) are supported at each end by a bearing means such as 27. As the shafts 5 (a) and 5 (b) rotate, the the left anf right riser assemblies as seen in FIG. 1 will move forward. Each riser assembly has an internal threaded slide block such as at 9 and 10 in FIG. 2 that engage the threaded shafts 5 (a) and 5 (b) respectively. Each riser assembly is comprised of slide blocks 9 and 10, slide plate 11, pins 12 and 13, riser bar 14 and vertical slide 15. Operation and description will be discussed in relation to the left riser assembly depicted in FIG. 2. Operation in the right riser assembly would be identical. The movable panel 7 is attached to the riser assemblies and specifically riser bar 14 by means of screw 26, and consists of "O" ring 22, panel 23, panel frame 25 and key 24. The actual speed at which the panel 23 slides back and forth in the frame channels 28 (a) and 28 (b) is determined by the number of threads per inch selected on the threaded shafts 5 (a) and 5 (b). As a result of a conscientious, predetermined thread selection, a gear reduction unit, as such, between the electric motor 1 and threaded shafts 5 (a) and 5 (b) is not required. Additionally, the adjustable slip clutch drive chains 3 (a) and 3 (b) and sprockets 4 (a) and 4 (b) can also be modified to alter or adjust the speed of panel 23.

Figure 2:
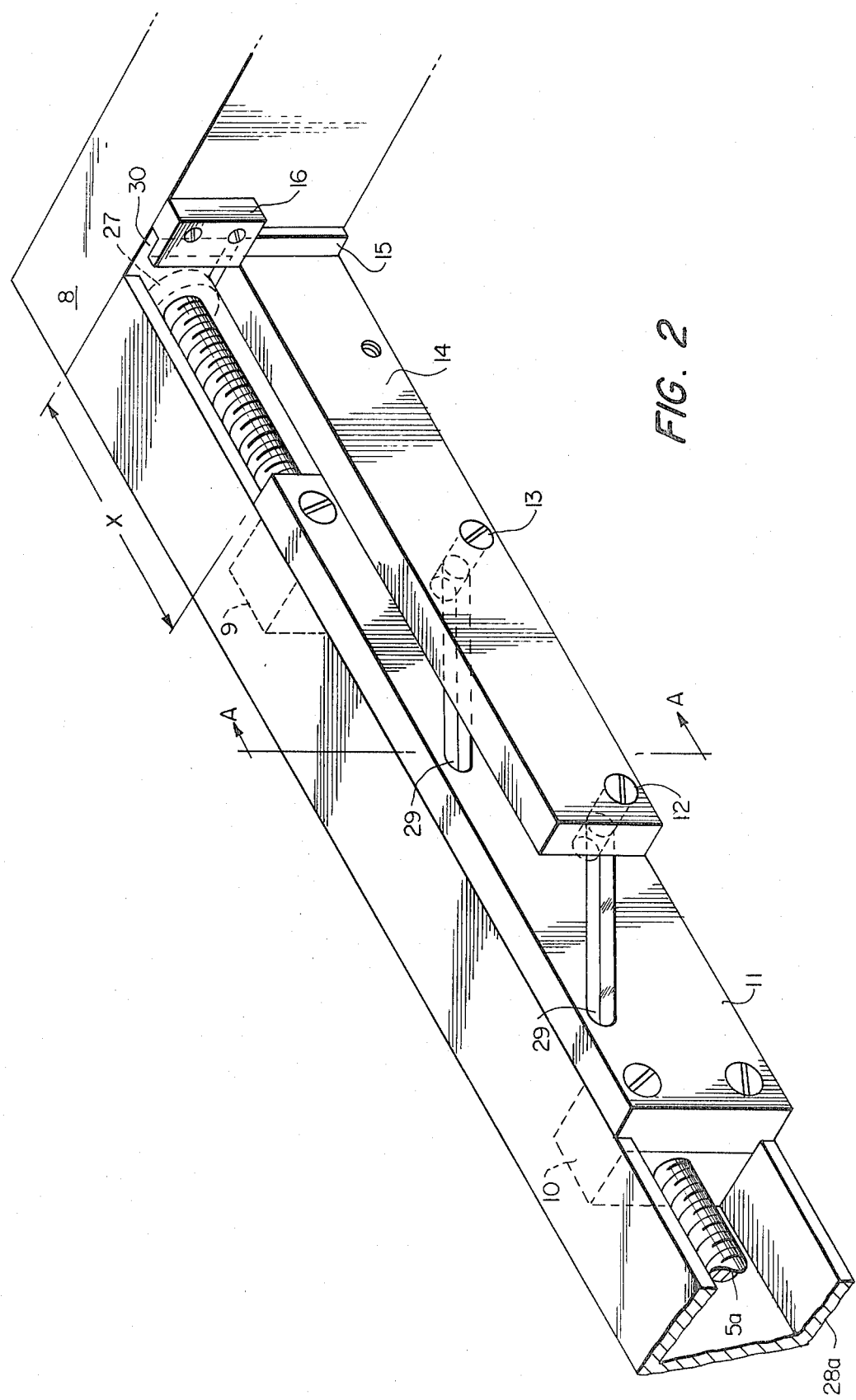
FIG. 2 An enlarged perspective detailed view of the left portion of the riser assembly positioned in the frame channel at the point of contact with a forwardmost frame member.

In FIG. 2 it can be seen that as this riser assembly approaches the forwardmost portion of the frame 8, the riser bar 14 will contact the front portion of the frame 8. Attached to the front of the bar 14 is a vertical slide 15 which is comprised of any low friction material such as a delrin type plastic but is not limited to this material. As this assembly moves further forward, the angle slots 29 of the verticle slide plates 11, also constructed of any low friction material, impart a purely verticle motion to the bar 14 by means of pins 12 and 13. As the riser bar 14 moves vertically, the vertical slide 15 will move into the cut-out portion 30 of the vertical bar holder 16. The purpose of holder 16 will be discussed hereinafter. Depending on the angle chosen for and the angle slots 29 in slide plate 11 and the distance "x" in FIG. 2, the power delivered to the slide plate 11 for verticle motion can be predetermined. Further, the distance chosen for "x" should be long enough to allow for a compression set of the elastomeric seal 21 shown in FIG. 3.

As the movable panel assembly 7 containing the window panel 23 moves vertically, it engages the elastomeric seal 21 that is so configured as to compress upon the application of vertical movement. The angle of taper on the elastomeric seal 21 and the panel frame 25 are chosen to be of different values so as to effect an interference fit. This is the primary seal. A secondary seal is also employed as a back-up. The secondary seal makes use of a small radius edge 31 pressed directly against the elastomeric seal 21. The small radius 31 of the edge of the panel frame 25 can be seen in FIG. 3. This reduces the power requirements for the secondary seal. It can also be appreciated that the distance "x" in FIG. 2 and the setting of slip clutch 2 allow for an adjustment of the compression force.

Upon application of reverse power to the motor 1, the riser assemblies will start to move rearward. As the riser assemblies move rearward, riser bar 14 will be held forward by the holder 16 until the action of the inclined slots of plate 11 on the pins 12 and 13 attached to riser bar 14 is complete. Holder 16 is positioned so as to hold the riser bar 14 forward while it is continuing its vertical descent. When all vertical descent is completed, the riser bar 14 will take on the rearward movement of the riser assemblies thereby transporting the panel rearward.

FIG. 3 depicts the front view of a cross-section taken along line A—A in FIG. 2. Numeral 17 is an adjuster block to permit adjustment for spacings in different vehicles. Numeral 18 is a sealing ring frame to hold elastomeric seal 21. Screw 19 affixes the sealing ring frame 18 to adjustor block 17 and, alternatively, affixes both elements to frame 8. Sealing ring frame 18 and elastomeric seal 21 combine to form sealing ring assembly 6 which is affixed as indicated hereinbefore. Fastener 20 holds sealing ring 21 to the roof of the vehicle. Key 24 holds panel 23 in place in panel frame 25 which is sealed by "O" ring 22.

From the foregoing, it may be seen that the present invention provides a useful mechanism for a sunroof, particularly in a vehicle. The structure is simple, efficient, and easily constructed.

The present invention may be embodied in other specific forms without departing from the spirit or essential characteristics thereof. The presently disclosed embodiments are therefore to be considered in all respects as illustrative and not restrictive. The scope of the invention being indicated by the appended claims rather than by the foregoing description, and all changes which come within the meaning and range of equivalency of the claims are therefore intended to be embraced therein.

What is claimed is:

1. A sunroof comprising a frame unit with transversely spaced left and right channels, each of said channels adapted to receive a threaded shaft member, left and right riser assemblies affixed to said frame unit and a panel held in place by a panel frame affixed to said riser assemblies, wherein each said left and right riser assembly is comprised of a slide block operatively connected to said threaded shaft member and slidably received in each of said channels, a slide plate affixed to the said slide block, said slide plate having a plurality of slots, a riser bar with a plurality of pins projecting therefrom for movable engagement with said slots, and means for causing said riser bar to move relative to said slide block in a vertical plane.

2. A sunroof according to claim 1, wherein a key means retains the panel in place in said panel frame.

3. A sunroof according to claim 2, wherein, the threaded shafts are connected to a motor by chain and sprocket means to drive said threaded shafts.

* * * * *